(12) United States Patent
Haller et al.

(10) Patent No.: US 8,639,415 B2
(45) Date of Patent: Jan. 28, 2014

(54) METHOD FOR CORRECTION OF DYNAMIC OUTPUT SIGNALS OF INERTIAL SENSORS HAVING MOUNTING OFFSETS

(75) Inventors: Mark Haller, Midland, MI (US);
Patrick Hartman, Canton, MI (US);
Gary M. Kempen, Bloomfield, MI (US)

(73) Assignee: TRW Automotive U.S., LLC, Livonia, MI (US)

( * ) Notice: Subject to any disclaimer, the term of this patent is extended or adjusted under 35 U.S.C. 154(b) by 45 days.

(21) Appl. No.: 13/060,489

(22) PCT Filed: Aug. 24, 2009

(86) PCT No.: PCT/US2009/054753
§ 371 (c)(1),
(2), (4) Date: Feb. 24, 2011

(87) PCT Pub. No.: WO2010/027731
PCT Pub. Date: Mar. 11, 2010

(65) Prior Publication Data
US 2011/0153156 A1    Jun. 23, 2011

Related U.S. Application Data

(60) Provisional application No. 61/091,532, filed on Aug. 25, 2008.

(51) Int. Cl.
*G06F 7/00* (2006.01)
(52) U.S. Cl.
USPC ............................................. 701/36

(58) Field of Classification Search
USPC .................... 701/36, 45, 82, 90, 91
See application file for complete search history.

(56) References Cited

U.S. PATENT DOCUMENTS

| | | | |
|---|---|---|---|
| 4,675,820 A | 6/1987 | Smith et al. | |
| 5,510,989 A | 4/1996 | Zabler et al. | |
| 6,169,939 B1 | 1/2001 | Raad et al. | |
| 6,853,947 B1 | 2/2005 | Horton | |
| 7,085,642 B2 * | 8/2006 | Samuel et al. | 701/82 |
| 7,366,598 B2 * | 4/2008 | Ono et al. | 701/30.2 |
| 7,373,227 B2 * | 5/2008 | Lu et al. | 701/70 |
| 7,707,867 B2 * | 5/2010 | Babala et al. | 73/1.38 |
| 7,885,750 B2 * | 2/2011 | Lu | 701/90 |
| 7,970,512 B2 * | 6/2011 | Lu et al. | 701/41 |
| 7,979,231 B2 * | 7/2011 | Eckert | 702/104 |
| 8,065,104 B2 * | 11/2011 | Fiedler et al. | 702/95 |
| 8,165,742 B2 * | 4/2012 | Wu et al. | 701/29.1 |
| 8,195,357 B2 * | 6/2012 | Basnayake | 701/33.1 |
| 2003/0088349 A1 | 5/2003 | Schubert et al. | |
| 2003/0158633 A1 | 8/2003 | Schubert | |
| 2003/0236604 A1 * | 12/2003 | Lu et al. | 701/45 |

* cited by examiner

*Primary Examiner* — Thomas Tarcza
*Assistant Examiner* — Alex C Dunn
(74) *Attorney, Agent, or Firm* — MacMillan, Sobanski & Todd, LLC (57) ABSTRACT

A method for compensating inertial sensor measurement outputs for mounting locations that are not coincident, nor orthogonal, with the vehicle center of gravity. The method further utilizes vehicle angular rate measurements, data, or estimates to determine the discrete acceleration components of the composite inertial sensor measurement output.

20 Claims, 9 Drawing Sheets

METHOD FOR CORRECTION OF DYNAMIC OUTPUT SIGNALS OF INERTIAL SENSORS HAVING MOUNTING OFFSETS

BACKGROUND OF THE INVENTION

This invention relates in general to a method for compensating an output signal of an inertial sensor to correct for varied sensor mounting locations. In particular, this invention relates to a method for compensating accelerometer output signals with other vehicle sensor outputs for use in a vehicle stability control system.

Performing vehicle stability control with an electronic control unit (ECU) requires accurate inputs of a vehicle's inertial state. This is accomplished with one or more angular rate sensors for detecting and measuring vehicle rotation about a vehicle spatial axis and one or more of a lateral, longitudinal, and vertical accelerometer adapted to measure a vehicle inertial state in a corresponding axis. The vehicle spatial axes are those axes having a point of origin at a vehicle center of gravity, CG. For example, a roll rate sensor may be provided for measuring an angular velocity about a longitudinal axis, and either a single axial accelerometer, such as a lateral accelerometer, or multiple accelerometers, such as a lateral accelerometer and a longitudinal accelerometer, may be provided to measure the corresponding axial acceleration. Regardless of how many accelerometers are utilized, it is necessary that all of the accelerometers are accurately mounted in a known relationship to the vehicle's three spatial axes and the relative rotational degrees of freedom about each spatial axis. The mounting accuracy of the accelerometer relates to the co-linearity of a principal measurement or sensing axis of the accelerometer to the corresponding vehicle spatial axis.

Figure 1:
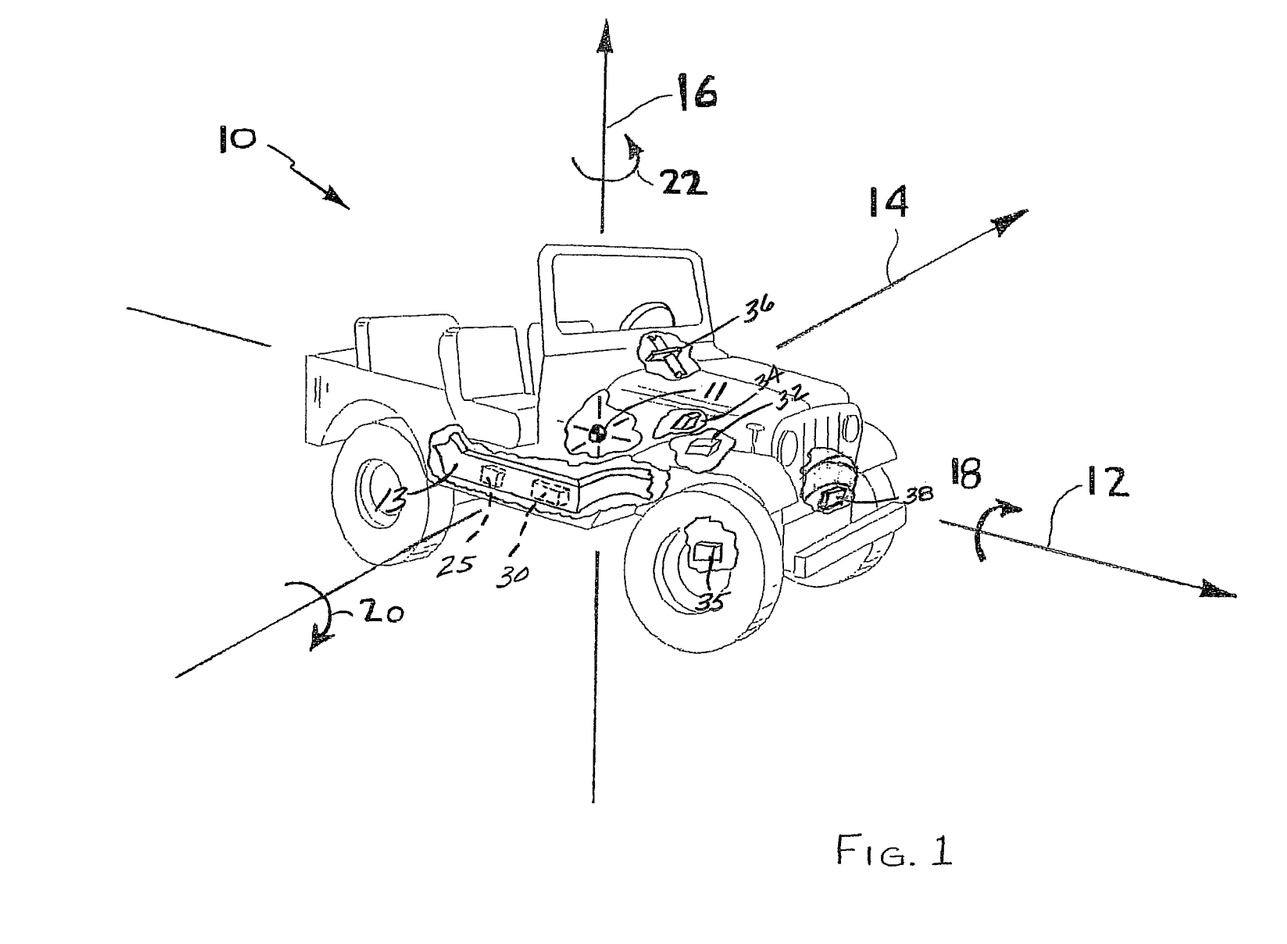
FIG. 1 illustrates a directional control axis system for a vehicle including a vehicle CG and selected vehicle sensors and mounting locations.
Figure 3:
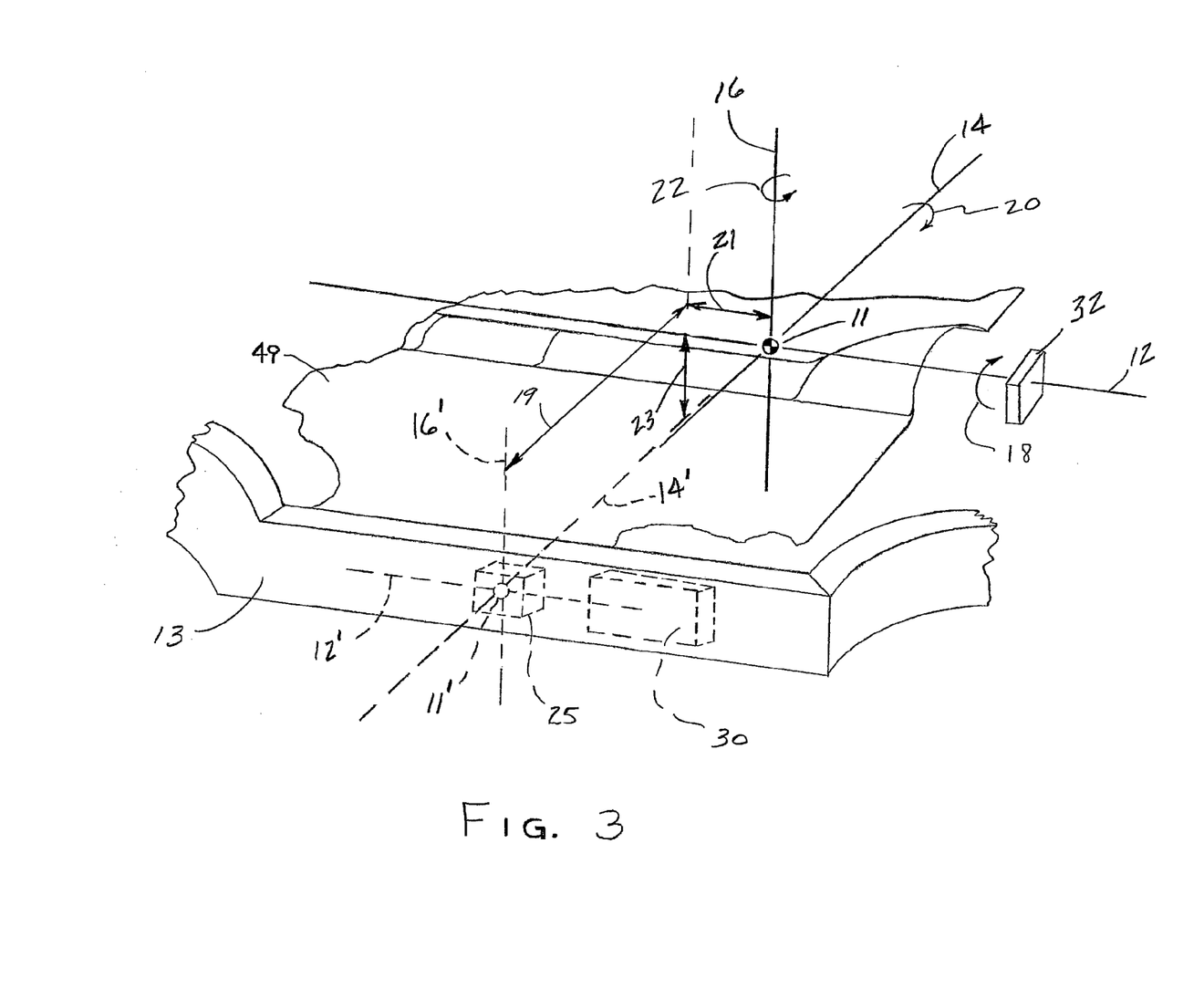
FIG. 3 is an enlarged, perspective view, in a cut-away partial cross section, of a lower vehicle structure section of the vehicle in FIG. 1 having an inertial sensor and an ECU mounted thereon.

The three vehicle spatial axes for a vehicle 10 are illustrated in FIGS. 1 and 3 where the axis labeled 12 corresponds to the vehicle longitudinal axis that runs along the length of the vehicle and points toward the forward direction of movement for the vehicle. A second spatial axis labeled 14 corresponds to the vehicle lateral axis and is perpendicular to the longitudinal axis 12. A third spatial axis labeled 16, that extends perpendicular to the plane formed by the longitudinal and lateral axes 12 and 14, corresponds to a vertical axis of the vehicle. The three vehicle spatial axes intersect at the vehicle center of gravity (CG) 11. Thus, an accelerometer for measuring acceleration of the vehicle would be ideally mounted at the vehicle CG.

The three relative rotational velocities are also illustrated in FIG. 1 where the circular arrow labeled 18 that is centered upon the longitudinal axis 12 corresponds to vehicle roll velocity while the circular arrow labeled 20 that is centered upon lateral axis 14 corresponds to vehicle pitch velocity. Similarly, the circular arrow labeled 22 that is centered upon the vertical axis 16 corresponds to yaw velocity. Each of these rotational velocities may be measured by a rotational velocity sensor, or angular rate sensor, that would ideally have its axis of rotation parallel to the vehicle spatial axis about which the rotational velocity occurs. Thus, for a measurement of roll velocity, the corresponding roll velocity sensor would have its axis aligned with the vehicle longitudinal spatial axis 12.

Ideally, the rotational velocity sensors and accelerometers are each mounted with their principle sensing axes aligned with one of the vehicle's corresponding three spatial axes. If the rotational rate sensors and accelerometers are not accurately mounted, erroneous information will be transferred to the ECU. A method to correct for mounting offset errors of sensors having sensor axes that are substantially coincident with the vehicle's three spatial axes is disclosed in U.S. patent application Ser. No. 11/712,321, filed Feb. 28, 2007, the disclosure of which is incorporated herein by reference in entirety. The method for correcting sensor mounting errors relative to the vehicle spatial axes is a function of the angular misalignment of the sensor axis to the corresponding vehicle spatial axis. The sensor output correction is in the form of a calibration factor that mathematically realigns the corresponding sensing and vehicle spatial axes.

However, because of the wide variety of vehicle platform architectures that are manufactured, it is not always practical to mount the accelerometers in a coincident orientation to the vehicle CG, or even each of the three vehicle spatial axes. Instead, it often becomes necessary to provide an off-axis mounting location for an accelerometer where at least one of the vehicle spatial axes does not intersect with the inertial sensor mounting location. It is therefore desirable to facilitate a higher degree of flexibility in sensor mounting locations within the vehicle platform. In addition to compensating for sensor mounting inaccuracies, it would be desirable to provide a correction method to compensate for inertial sensors mounted in an off-axis location. It would be further desirable to utilize existing subsystem rotational, acceleration, and angular velocity sensors as inputs into a dynamic correction algorithm.

BRIEF SUMMARY OF THE INVENTION

This invention relates to compensation of accelerometer output signals where the accelerometers have an off-axis mounting location relative to the spatial axes of a vehicle's center of gravity. This invention further relates to a method of accelerometer compensation utilizing various vehicle sensor outputs as inputs to a correction algorithm. The corrected accelerometer output signal is applicable for use in a vehicle stability control system.

This invention contemplates providing a method for compensating an accelerometer output for use in a vehicle control system. The method includes providing an accelerometer at a first location that is different from a vehicular center of gravity location. The first location defines a moment arm from an axis of a vehicle center of gravity coordinate system to the accelerometer location. The method further provides at least one angular rate sensor and a control module. The control module communicates with the accelerometer and the angular rate sensor in order to compensate an output signal generated by the accelerometer.

The accelerometer, mounted at the first location, senses an acceleration and generates an output signal that is proportional to the sensed acceleration. The angular rate sensor senses a rate of change of a rotational movement about at least one of the axes of the vehicular center of gravity coordinate system. The angular rate sensor then generates an output signal that is proportional to the rate of change of the rotational movement.

The control module receives the accelerometer output signal and the angular rate sensor output signal. The control module calculates an angular acceleration from the angular rate sensor output signal. The control module then determines an accelerometer correction factor that is proportional to the moment arm and the angular velocity and acceleration. The control module modifies the accelerometer output signal in response to the correction factor.

The method of this invention also contemplates providing a plurality of sensors mounted at various locations throughout the vehicle. The plurality of sensors would be capable of sensing various vehicle characteristics and generating output signals that are proportional to the measured characteristics.

Further, the sensors would also be in communication with the control module. The control module would receive these additional sensor output signals and derive at least one angular acceleration from the plurality of sensor output signals. The control module would then determine an inertial sensor correction factor. The inertial sensor correction factor would be proportional to the angular acceleration derived from the plurality of sensor output signals.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 2:
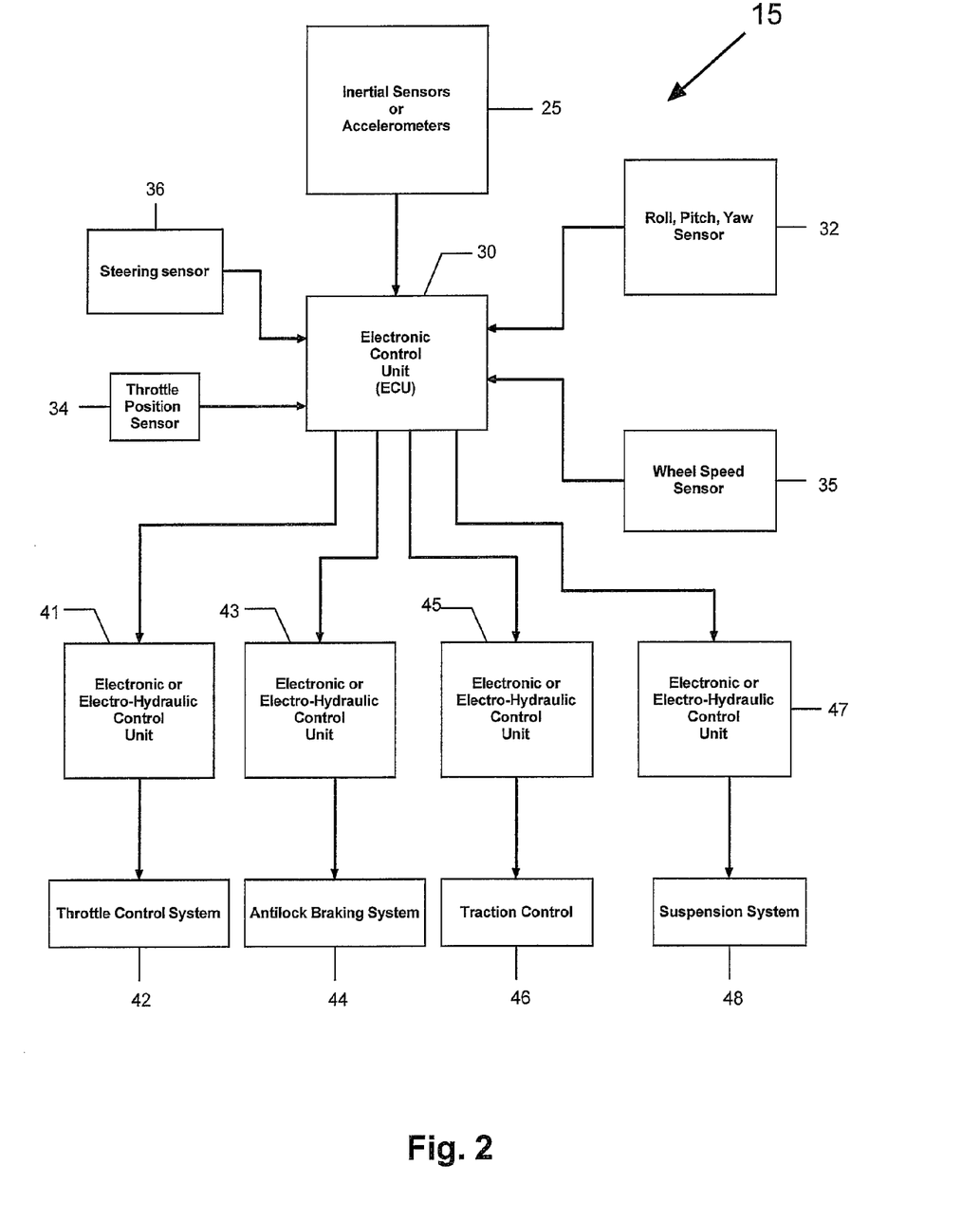
FIG. 2 is a schematic representation of a vehicle stability control system including an electronic control module having a correction algorithm, various sensor inputs, and various subsystems responsive to the electronic control module of the vehicle shown in FIG. 1.

Referring now to the drawings, there is illustrated in FIG. 1 a vehicle 10 including a plurality of sensors provided in various mounting locations thereon. The plurality of sensors include an at least one axial accelerometer 25 and an at least one rotational rate sensor 32, typically characterized as one of a roll, pitch, and yaw rate sensor 32. These sensors provide necessary inputs to an electronic control unit (ECU) 30 to effect operation of a vehicle stability control (VSC) system 15, as shown in FIG. 2. The vehicle 10 may further include a plurality of vehicle parameter sensors that do not directly measure inertia or roll, pitch, and yaw rates. These sensors may include, but are not limited to, a throttle position sensor 34, a wheel speed sensor 35, a steering angle or steering angle rate sensor 36, and an air bag deployment sensor 38.

FIG. 2 is a schematic representation of the VSC system 15 that is part of the vehicle 10 of FIG. 1. The VSC system 15 includes the electronic control unit (ECU) 30 operating in accordance with a correction algorithm that is stored therein and a plurality of vehicle sensors connected thereto for measuring vehicle dynamic characteristics. The correction algorithm has at least one operative routine to adjust the inertial sensor output by a correction factor. The correction factor is determinable based on outputs of the rotational rate sensor 32, and the known moment arm from the axial accelerometer mounting location to the vehicle spatial axis about which the rotation is measured. The values of the moment arms may be stored in the ECU 30, in a non-volatile memory if so desired, for input into the correction algorithm. The correction algorithm further includes a series of executable steps within broader functional blocks schematically illustrated in FIGS. 5-7. These functional blocks will be described in detail below. In general terms, the ECU 30 accepts data from the various accelerometer and rotational rate sensor input signals. The necessary input signals are then processed by the ECU 30 to correct the accelerometer outputs. The functional blocks of FIGS. 5-7, broadly representing categories of the executable steps, may further include determining the VSC system 15 state of activation and terminating operation, as will be described below.

The vehicle sensors associated with the VSC system 15 or ECU 30 include the axial accelerometer 25 and at least one of the roll, pitch and yaw rate sensors 32 that are conventional and known in the art. Though shown in the schematic diagram of FIG. 2 as a singular functional block, the roll, pitch and yaw rate sensors 32 are understood to be either a single integrated sensor unit, separate sensor units mounted on the separate longitudinal 12, lateral 14, and vertical 16 vehicle spatial axes, as described above, or a combination of an integrated unit and a separate unit. For purposes of illustration, the invention will be described in conjunction with only the roll rate sensor 32. It should be understood, however, that the invention contemplates the inclusion of pitch and yaw rate sensor inputs in alternative embodiments. Furthermore, the roll sensor 32 in FIG. 1 is shown in an arbitrary location for description purposes only. It will be appreciated by those skilled in the art that all vehicle sensor locations shown in FIG. 1 may be other than illustrated, if so desired. Where possible, the same numbers are used in each figure to identify similar components, features, and functionality of the invention.

The VSC system 15 of FIG. 2 may further include inputs from other vehicle parameter sensors that do not directly measure inertia or roll, pitch, and yaw rates. These sensors may include, but are not limited to, the throttle position sensor 34, the wheel speed sensor 35, the steering angle or steering angle rate sensor 36, and the air bag deployment sensor 38. The sensors may communicate with the ECU 30 through conventional cabling or other wired connections, such as a controller area network (CAN). Certain sensors, however, may be integrated into the ECU 30, if so desired. The VSC system 15 further includes connections to at least one of the vehicle control subsystems, as shown in FIG. 2.

The VSC system 15 has a capability to vary one or more of the vehicle control subsystems in order to modify the movement of the vehicle's center of gravity 11 and thus a vehicle dynamic characteristic. The sensors may further be operatively connected to or mounted on a vehicle control subsystem, such as, for example, a throttle control system 42, an anti-lock braking system 44, a traction control system 46, and/or a suspension system 48 as shown in FIG. 2. These subsystems are intended to be illustrative of vehicle control subsystems generally and are neither limiting in scope nor exhaustive in nature or disclosure. Further, the functional response outputs of these subsystems, which are known in the art, provide the reactive forces and vehicular reactions that define the various vehicle dynamic characteristics varied by the VSC system 15. The throttle control system 42, the anti-lock braking system 44, the traction control system 46, and the suspension system 48 may each provide a separate subsystem ECU or Electro-Hydraulic Control Unit (EHCU) 41, 43, 45, and 47 respectively, or such control units may be integrated into the vehicle's ECU 30.

The vehicle control subsystems may be operative by either electronic or hydraulic based actuation means. For example, the throttle control system 42 may be actuated by way of an electronic sensor that cooperates with the accelerator pedal to transmit driver speed control intentions. Alternatively, the throttle control system may be a hydraulically actuated device where the driver's speed control intentions are relayed as displacement of hydraulic fluid or variations in pressure. Furthermore, the traction control system 46 may be operative to actuate the hydraulic braking system to effect modulation of torque output. Alternatively, the traction control system may include clutching devices may be magnetically coupled, for example, by way of magneto-rheological fluids or magnetically actuated friction materials, to modulate the powertrain torque output. These systems may further cooperate with the fuel regulation or injection systems to coordinate engine output with the operative VSC subsystem.

The subsystem ECUs or EHCUs 41, 43, 45, and 47 may include sensor mounting locations or such sensor mounting locations may be separate from the subsystem ECUs or EHCUs, if so desired. The mounting locations of these various sensors may be internal to the ECU, internal to a portion of the vehicle control subsystem, or directly mounted onto the vehicle structure. The vehicle control subsystems of the VSC system 15 may each include a subsystem ECU or EHCU either as an integral component in the subsystem or a separate structure mounted thereon The subsystem ECU or EHCU's 41, 43, 45, and 47 may alternatively be mounted to the vehicle or may further be an integral portion of the ECU 30, if so desired.

FIG. 3 illustrates a portion of a vehicle chassis that includes a frame member 13 and a section of a vehicle floor pan 49. The vehicle CG 11 and the vehicle spatial axes 12, 14, and 16 are shown relative to an axial accelerometer center 11' and an accelerometer coordinate system. The accelerometer coordinate system includes a longitudinal axis 12', a lateral axis 14' and a vertical axis 16'. Each of the accelerometer coordinate system axes 12', 14', and 16' are parallel to, and either offset from, or coincident with, the corresponding vehicle longitudinal axis 12, vehicle lateral axis 14, and vehicle vertical axis 16, respectively. When at least one of the accelerometer axes 12', 14', and 16' is offset from at least one of the vehicle spatial axes 12, 14, and 16, respectively, an off-axis condition results, along with an associated signal error.

Signal error due to accelerometer off-axis mounting can be characterized as a function of a moment arm extending between one or more of the vehicle spatial axes and a corresponding sensing axis of an accelerometer. Each of the moment arms 19, 21, and 23, as shown in FIG. 3, represents an off-set distance of the accelerometer 25 relative to the respective axes of the vehicle CG 11. For example, FIG. 3 illustrates an accelerometer 25 mounted in a location that is not coincident with any of the vehicle spatial axes. Compensating for an off-set distance of a sensor mounting configuration utilizes at least one additional sensor input, such as the measurement of a rotational velocity about at least one vehicle spatial axis. The measured rotational velocity is taken about the vehicle spatial axis that is perpendicular to both the axial accelerometer sensing axis and the moment arm.

The sensing axis of the accelerometer 25 may be generally aligned with at least one of the accelerometer coordinate system axes 12', 14', and 16'. The sensing axis of the accelerometer 25 is oriented in the direction of the desired measurement. For example, when aligned parallel to the vehicle lateral axis 14, the sensing axis is generally coincident with accelerometer axis 14' in order to measure the lateral acceleration of the vehicle.

Though the sensing axes of the accelerometers and rotational rate sensors are described as being substantially aligned with, or parallel to, the corresponding inertial sensor axes 12', 14', and 16' or the vehicle spatial axes 12, 14, and 16, further refinement may be made by adjusting for manufacturing inaccuracies associated with the sensors and their respective sensor axis mounting alignments upon the vehicle. The signal errors due to inertial sensor mounting inaccuracies can be adjusted by applying a static calibration factor to realign the sensing axis with the relative vehicle spatial axis, including any relative axis offsets therefrom. The static calibration factor is determined by testing the sensors relative to a mounting structure and may further include testing in a mounted state on the vehicle as described in U.S. patent application Ser. No. 11/712,321, filed Feb. 28, 2007. The calibration factor may be subsequently applied to all sensor output signals used in the method of this invention.

In addition to the axial accelerometer 25, the roll rate sensor 32 is mounted in a position within vehicle 10 to sense the roll velocity, oriented with circular arrow 18 about the vehicle longitudinal axis 12. Though the roll sensor 32 is shown mounted on the vehicle longitudinal axis 12, such is not required. The roll sensor 32 typically measures the roll velocity about the longitudinal axis 12 and generates an output signal that is proportional to the vehicle roll velocity as expressed in radians per second. Alternatively, the roll sensor 32 may be configured to directly measure the roll acceleration about the longitudinal axis 12 and generate an output signal that is proportional to the vehicle roll acceleration as expressed in radians per second squared. Also, the ECU 30 may be capable of deriving either the unmeasured velocity or acceleration component from the roll sensor output by way of a differentiation or integration calculation known in the art. Alternatively, the roll sensor 32 may be structured to directly measure both velocity and acceleration values, if so desired. These rotational measurements may be further segmented into tangential and radial components that are functions of the associated accelerations and forces acting the inertial sensor 25, as shown in FIG. 4.

Figure 4:
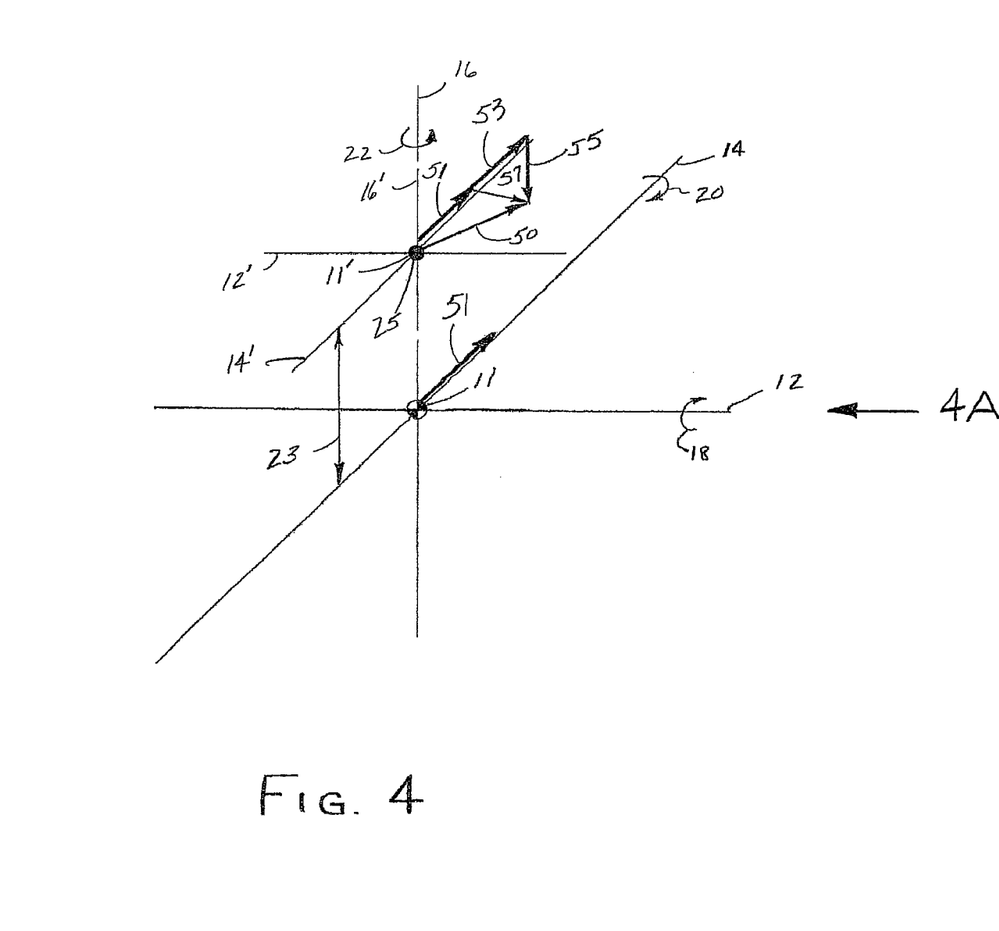
FIG. 4 illustrates the rotational velocities and accelerations affecting an axial accelerometer mounted in an off-axis location from the vehicle CG of the vehicle in FIG. 1.
Figure 4A:
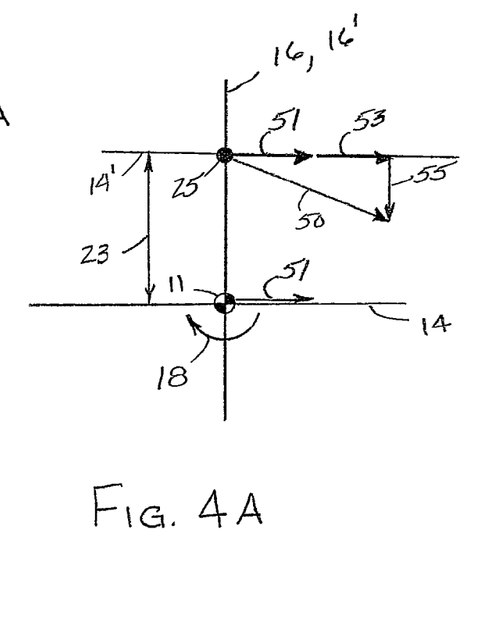
FIG. 4A is an end view of the axial accelerometer and vehicle CG axes of FIG. 4.

As described above, the ECU 30 of FIGS. 2 and 3 includes a memory capability having a non-volatile random access (NVRAM) portion that further includes a correction algorithm. The correction algorithm includes a series of executable commands, the operations of which are schematically shown as functional blocks in the flow charts of FIGS. 5-7. The correction algorithm further includes an equation having terms associated with the segmentation of the forces and accelerations acting on the inertial sensor 25. The equation has the general form:

$$a_{corrected} = (a_{measured}) - (\omega^2 R) - (d\omega/dt)R,$$

where each of the terms are illustrated in FIGS. 4 and 4A as arrows indicating the accelerations associated with the respective forces acting on the accelerometer 25. The term "R" is the moment arm which is the distance of one of the accelerometer axes to the corresponding vehicle CG spatial axis. The sensor moment arm, R, is perpendicular to the plane formed by the lateral and longitudinal axes 12 and 14.

In FIGS. 4 and 4A, the inertial sensor moment arm, R, is the distance labeled 23 from the sensor lateral axis 14' to the vehicle CG axis 14. The term "½ ω² R" represents the radial or centripetal acceleration component 55 of the angular acceleration, oriented with circular arrow 18 about the vehicle longitudinal axis 12, as acting on the inertial sensor 25 relative to the vehicle CG 11. The radial acceleration 55 is derived from the angular rate or angular velocity, ω and is typically expressed in radians per second. The term "(dω/dt)R" or "αR" represents the tangential acceleration component 53 of the angular acceleration as acting on the inertial sensor 25 relative to the vehicle CG 11. The cross product of the tangential and radial accelerations 53 and 55 is the total angular acceleration 57 acting on the inertial sensor 25. As a result, these forces and accelerations cause the inertial sensor 25 to measure a composite acceleration 50, that is, the vector sum of the various acceleration components. The vector summation of forces, or the acceleration components, can be effected by the geometrical relationship of $$C = (A^2 + B^2)^{1/2}$$

where C represents the vector sum and A and B represent orthogonally oriented components of force or acceleration. The above relationship may be utilized to determine the corrected acceleration value 51 as follows:

$$(a_{measured})^2 = 50^2 = (a_{corrected} + 53)^2 + 55^2,$$

which, upon rearranging the terms provides:

$$(a_{corrected} + 53)^2 = 50^2 - 55^2$$

Therefore, $$a_{corrected} = (50^2 - 55^2)^{1/2} - 53$$

which may also be expressed in terms of ω and R as, $$a_{corrected} = 51 = [50^2 - (\omega^2 R)^2]^{1/2} - (d\omega/dt)R; \text{ or:}$$

$$a_{corrected} = [(a_{measured})^2 - (\omega^2 R)^2]^{1/2} - (d\omega/dt)R$$

A similar approach may be applied to correct acceleration measured along the y axis 14, starting with the following general equation:

$$y''_{corrected} = y''_{accel} + (\Psi'\Theta' - \phi'')z_{disp}, \text{ or even:}$$

$$y''_{corrected} = y''_{accel} - (\Phi'')z_{disp} \text{ where:}$$

$y''_{corrected}$ = the lateral acceleration at the vehicle's center of gravity corresponding to $a_{corrected}$;
$y''_{accel}$ = the lateral acceleration at the accelerometer location corresponding to $a_{measured}$;
$z_{disp}$ = the vertical displacement of the center of gravity with respect to the accelerometer location corresponding to R;
$\Phi''$ = roll acceleration corresponding to ω;
$\Theta'$ = pitch rate; and
$\Psi'$ = yaw rate.

The invention also contemplates expanding and enhancing the control algorithm to include generalized transformation equations for vehicular motion. These generalized transformation equations may be similar to the equations disclosed by the National Highway Transportation Safety Administration (NHTSA) in §2.5.1.3 entitled "Chassis Dynamics" and contained in the Final Policy Statement of 49 CFR Part 575, entitled "Consumer Information; New Car Assessment Program; Rollover Resistance", the disclosure of which is incorporated herein by reference in entirety. The axis transformation equation disclosed therein has the form of:

$$y''_{corrected} = y''_{accel} - (\Phi'^2)y_{disp}$$

where $y''_{corrected}$ = the lateral acceleration at the vehicle's center of gravity corresponding to $a_{corrected}$;
$y''_{accel}$ = the lateral acceleration at the accelerometer location corresponding to $a_{measured}$; and
$y_{disp}$ = the lateral displacement of the center of gravity with respect to the accelerometer location corresponding to R; and
$\Phi'$ = roll rate corresponding to ω.

Another embodiment of the invention contemplates correcting three accelerometer readings with three rotational sensors by utilizing the corrections for each individual accelerometer as discussed above. The individual accelerometer corrections may also include compensation of interactions between the various rotational velocities 18, 20, and 22 and the inertial sensor coordinate system axes 12', 14', and 16'. For equations representing the three vehicle spatial axes and the three rotational axes, the NHTSA axis transformation equations have the form of:

$$x''_{corrected} = x''_{accel} - (\Theta'^2 + \Psi'^2)x_{disp} + (\Theta'\Phi' - \Psi'')y_{disp} + (\Psi'\Phi' + \Theta'')z_{disp}$$

$$y''_{corrected} = y''_{accel} + (\Theta'\Phi' + \Psi'')x_{disp} - (\Phi'^2 + \Psi'^2)y_{disp} + (\Psi'\Theta' - \Phi'')z_{disp}$$

$$z''_{corrected} = z''_{accel} + (\Psi'\Phi' - \Theta'')x_{disp} + (\Psi'\Theta' + \Phi'')y_{disp} - (\Phi'^2 + \Theta'^2)z_{disp}$$

where:

$x''_{corrected}$, $y''_{corrected}$, and $z''_{corrected}$ = longitudinal, lateral, and vertical accelerations, respectively, at the vehicle's center of gravity
$x''_{accel}$, $y''_{accel}$, and $z''_{accel}$ = longitudinal, lateral, and vertical accelerations, respectively, at the accelerometer location
$x_{disp}$, $y_{disp}$, and $z_{disp}$ = longitudinal, lateral, and vertical displacements, respectively, of the center of gravity with respect to the accelerometer location
$\Phi'$ and $\Phi''$ = roll rate and roll acceleration, respectively
$\Theta'$ and $\Theta''$ = pitch rate and pitch acceleration, respectively
$\Psi'$ and $\Psi''$ = yaw rate and yaw acceleration, respectively For the above NHTSA defined transformation equations, the values of $x_{disp}$, $y_{disp}$, and $z_{disp}$ correspond to moment arms $R_a$, $R_b$, and $R_c$ of the correction algorithm.

Figure 5:
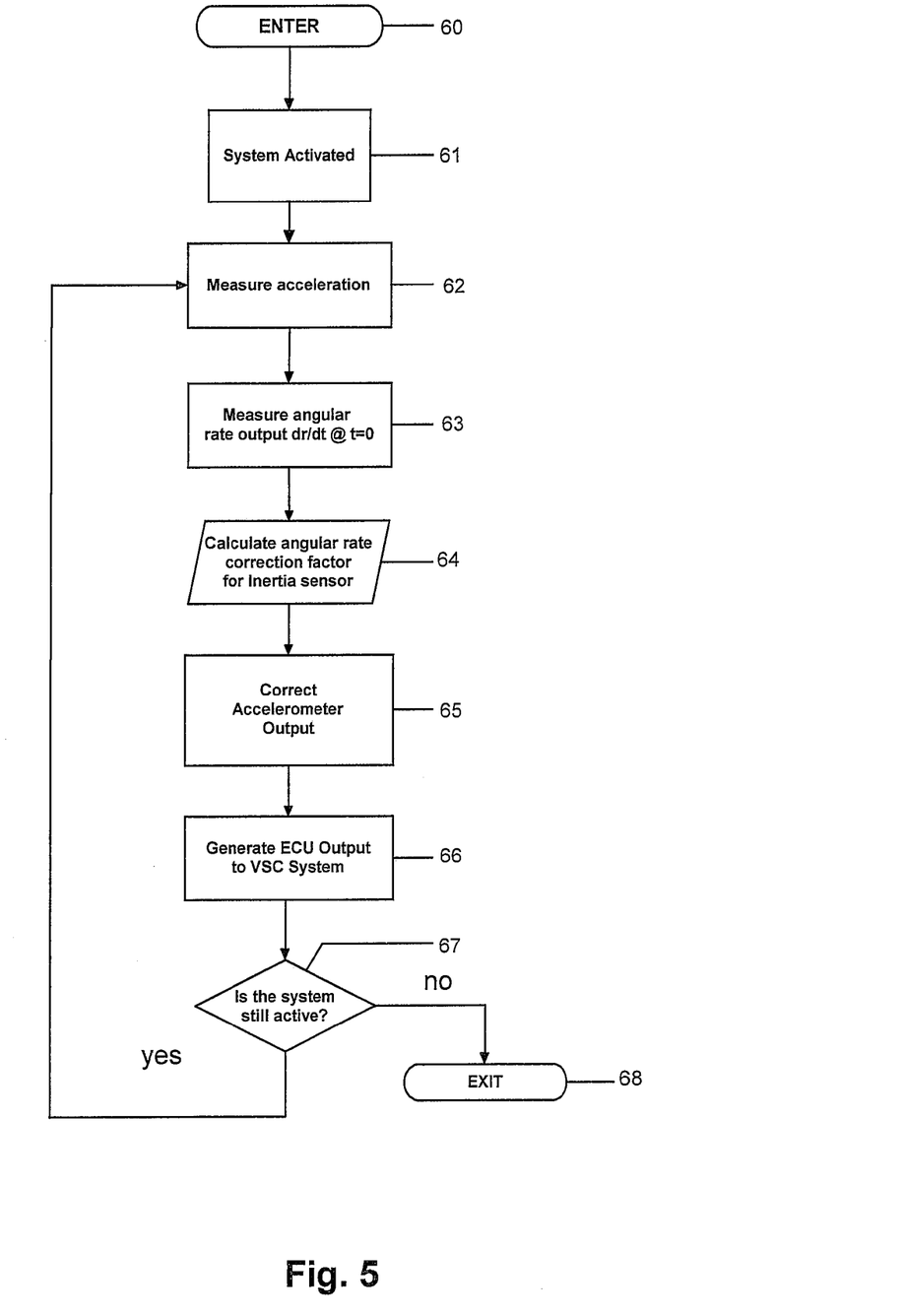
FIG. 5 is a flow chart of an algorithm for correcting an axial accelerometer output with an angular rate sensor output in accordance with the invention.
Figure 6:
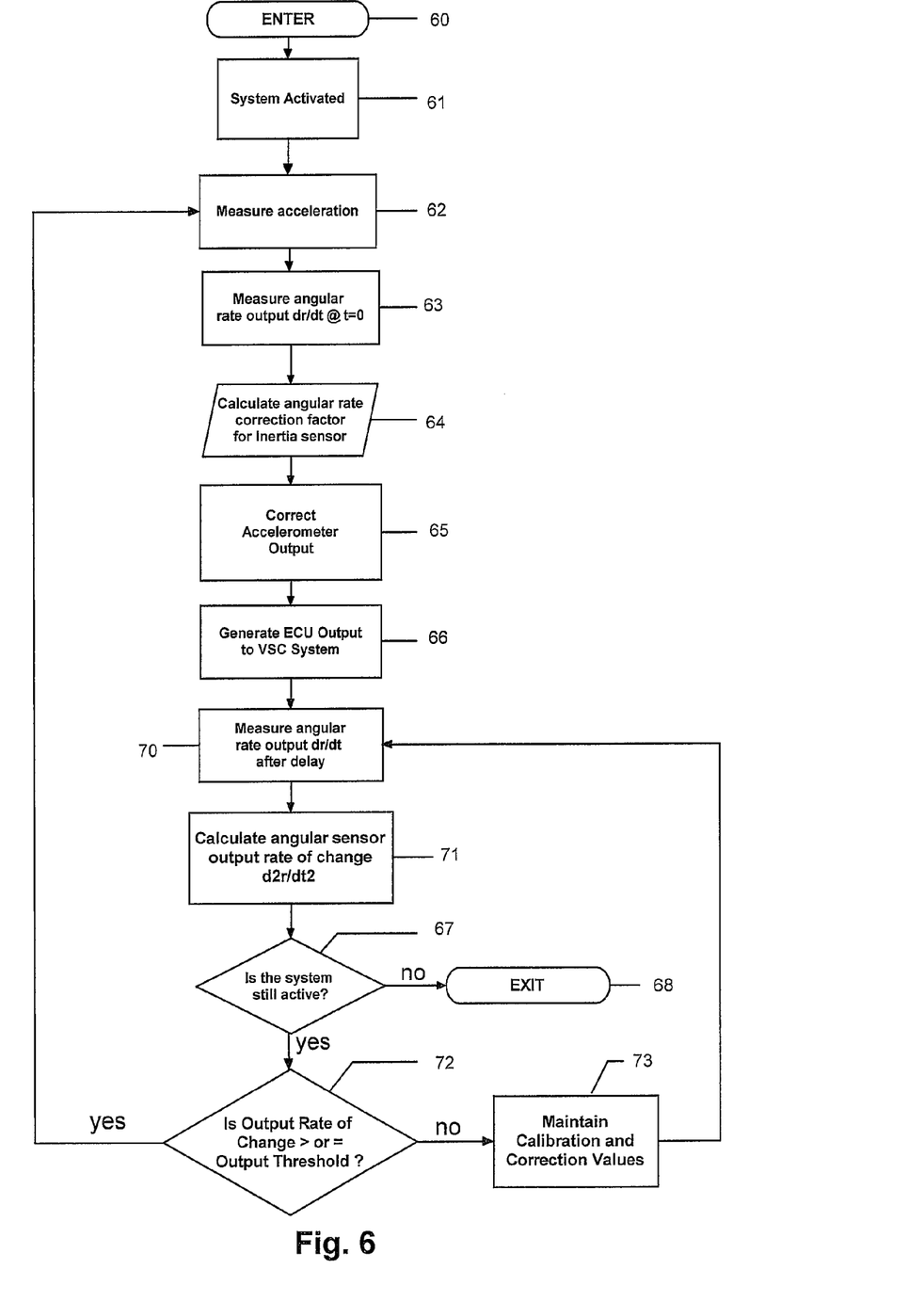
FIG. 6 is an alternate embodiment of the flow chart shown in FIG. 5 that further includes a threshold value comparison.
Figure 7:
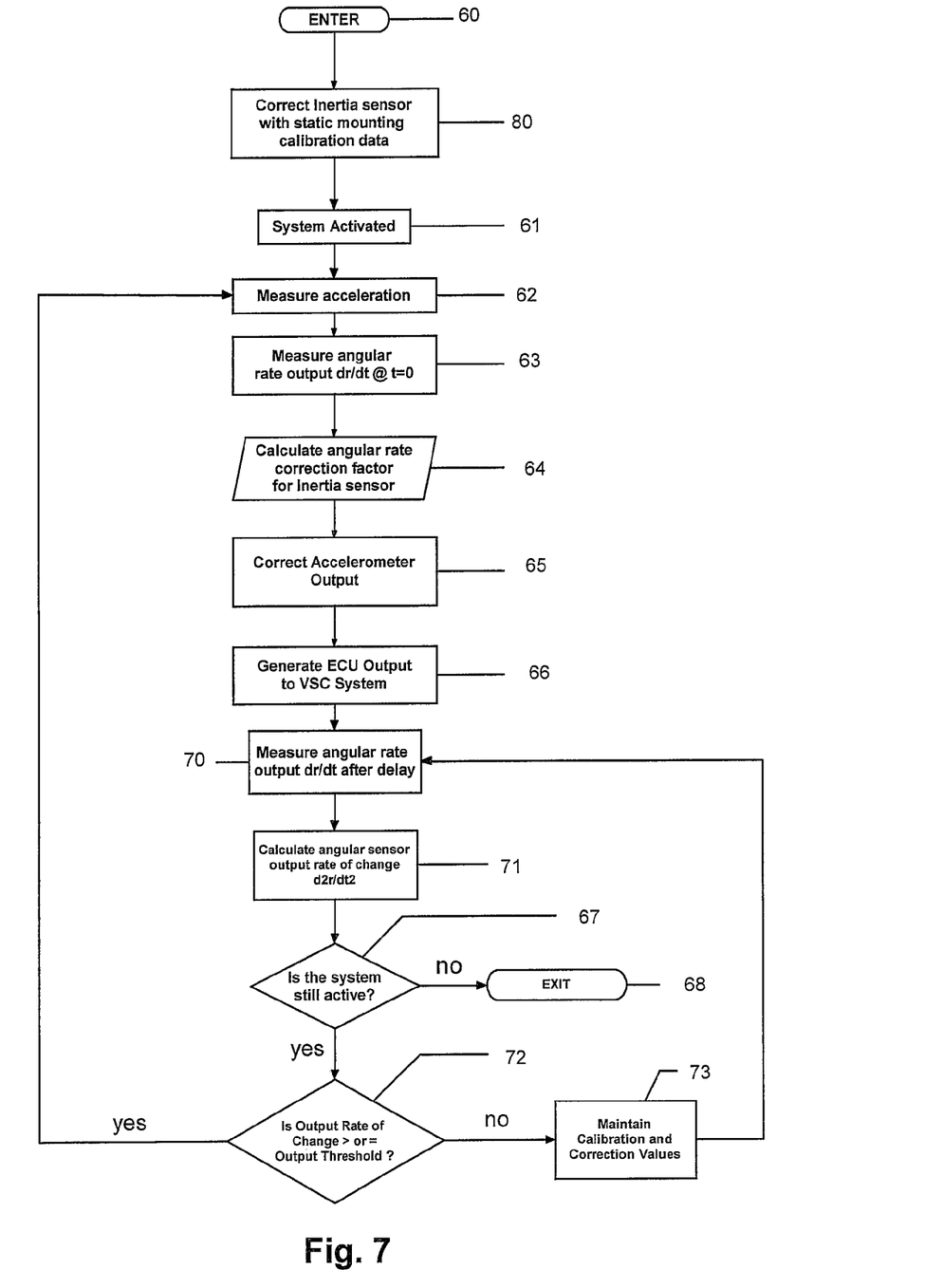
FIG. 7 is an alternate embodiment of the flow chart shown in FIG. 6 that includes a sensor mounting correction factor.

The method of the present invention is illustrated by the flow charts shown in FIGS. 5-7. The basic method is illustrated in FIG. 5, while FIGS. 6 and 7 provide expansion of blocks representing increased system capability, including the functional blocks of FIG. 5. The method shown in FIG. 5 is entered through the block labeled 60 and proceeds to functional block 61 where a vehicle system, such as, for example the ECU of the VSC system 15, is energized. The method proceeds to block 62 where readings are taken by the accelerometer(s) 25. These readings are axial accelerations, measured along the sensing axis. The sensor outputs are typically in voltage, current, or units of charge and are proportional to the axial acceleration as expressed in units of distance per time-squared. For example, typical metric (SI) units would correspond to meters per second-squared. The method then proceeds to functional block 63 where an angular rate measurement is taken by the angular rate sensor 32. The angular rate sensor output may be voltage, current, or units of charge and are proportional to the rotational velocity.

Once the axial acceleration and rotational velocity data are received by the ECU 30, the correction algorithm calculates the correction factor from the equations described above in functional block 64. The method step 65 applies the correction factor to generate a corrected acceleration output. The corrected acceleration output is used by the ECU 30, in method step 66, to generate an appropriate VSC system action which is executed by the subsystem ECU or EHCU. The ECU 30, at method step 67, determines if the system is still active. If the system is still active, the process returns to step 62 and the process repeats. If the system has been deactivated, the method exits through functional block 68.

FIG. 6 illustrates an expansion of the method of FIG. 5 wherein the system compares angular acceleration values over a specified time interval. Following generation of an appropriate VSC system action in functional block 66, a second angular rate measurement is taken after a predetermined time interval, or delay, at functional block 70. The ECU 30 then calculates the angular sensor output rate of change in functional block 71. If the system is determined to still be active in decision block 67, the ECU 30 then proceeds to decision block 72 and compares the rate of change of the measured angular data to an output threshold value stored therein. If the output rate is less than the threshold value, the system maintains the current correction value which may include no correction factor as a valid system response. The algorithm then transfers to functional block 70 to again measure the angular rate.

If, in decision block 72, the ECU 30 determines that the output rate is greater than or equal to the threshold value, the system then prepares for another acceleration measurement and transfers to functional block 62 to begin the process again. The comparison of rate of change values to the threshold value limits the system from hunting or overcorrecting for small values of acceleration to which many vehicle subsystems are not responsive. The sensor threshold value may be based on at least one factor such as, for example, VSC system response characteristics, vehicle subsystem operating parameters, and absolute acceleration values if so desired. The sensor output rate of change may be based on a second sensor output measured at a chosen time interval from the first sensor output.

FIG. 7 illustrates another embodiment of the invention that includes the method shown in FIG. 6 plus the application of a sensor mounting calibration correction factor. In functional block 80 a static sensor mounting calibration factor is applied to the inertial sensor output to correct for axial acceleration sensor and rotational sensor axis mounting errors. The present invention also contemplates that functional block 80 for the inclusion of the static sensor mounting calibration factor may be added to the flow chart shown in FIG. 5 (not shown).

Figure 8:
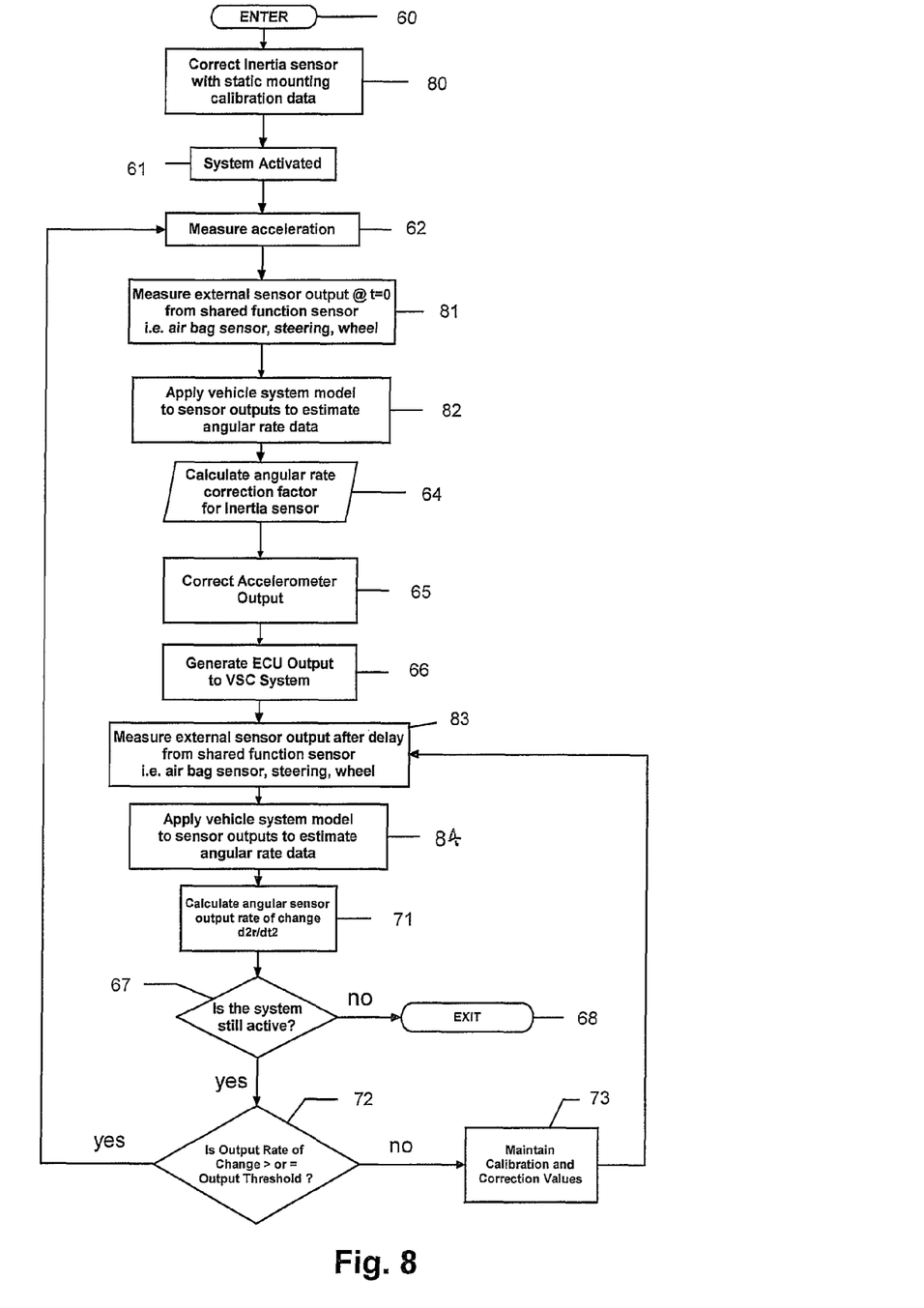
FIG. 8 is an alternative embodiment of the flow chart shown in FIG. 7 that includes sensor inputs from various subsystem sensors.

Yet another embodiment of the invention is shown in FIG. 8 where the capability of the method of FIG. 7 is approximated by estimating the angular rate output value from other on-board system sensors. As is known in the art, the angular rate information can be estimated based on the input data from the other on-board system sensors such as, for example, air bag sensors, steering position sensors, wheel speed sensors, throttle position sensors and the like. These values may be operated on by a portion of the algorithm containing a vehicle model that synthesizes an angular rate estimate for use in the inertial sensor correction algorithm. The steps of functional blocks 81 and 82 of FIG. 8 are substituted for an initial measurement of the angular rate, as shown in step 63 of FIG. 7. In functional block 81, data is collected from another on-board sensor while, in functional block 82, the vehicle model is utilized to calculate the needed angular rate value. The algorithm then proceeds as in FIG. 7 until the second measurement is taken after a time delay. The functional block 83 measures the appropriate shared function sensor outputs after a time delay. The algorithm again applies the new sensor values to the vehicle system model in functional block 84 to estimate a second angular rate. Similar to the method of FIG. 7, the rate of change of the estimated angular rates are compared to a threshold value in decision block 72. The present invention also contemplates that the use of the outputs of other sensors may be utilized to determine the angular rate in the algorithms illustrated in FIGS. 5 and 6 (not shown).

Figure 9:
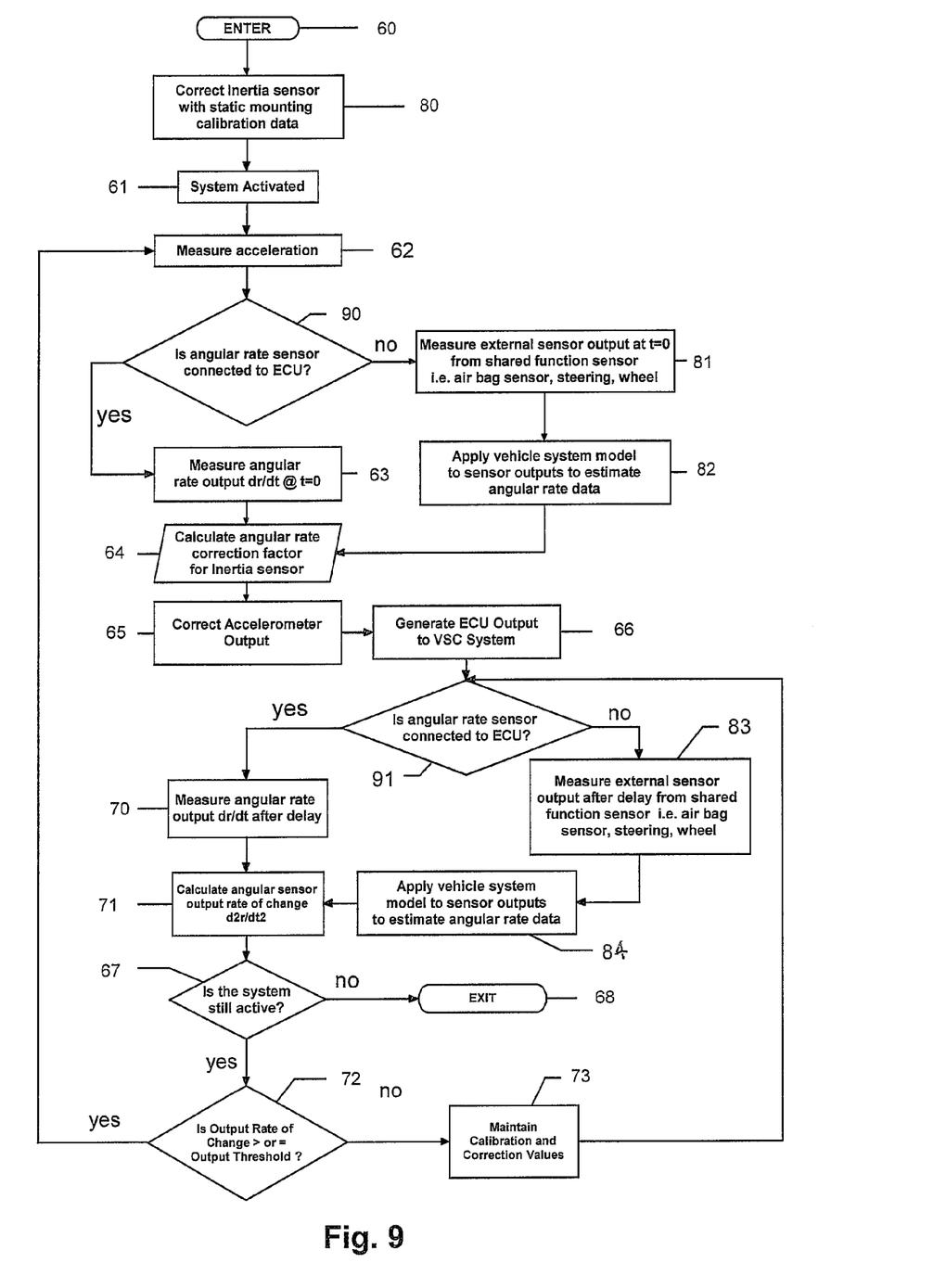
FIG. 9 is an alternative embodiment of the flow chart shown in FIG. 8 that includes sensor inputs from various subsystem sensors.

Another embodiment is shown in FIG. 9 where the capability of the method of FIG. 7 is augmented by a capability to rely on other on-board sensors to estimate the angular rate output value in the event of an angular rate sensor malfunction. The estimated angular rate output values are generated in the same manner as the output values of FIG. 8. As such, the method includes a decision block 90 to determine if an angular rate sensor is connected to the ECU 30. If no connection exists, functional block 81 directs the system to use the other on-board system sensors to estimate the angular rate. Functional block 82 then applies the vehicle system model to estimate the angular rate data, as was done in FIG. 8. This estimated data is substituted for the missing actual angular rate inputs. The algorithm further includes a second decision block 91 to recheck the angular rate sensor connection for the second, time-delayed measurement. If the angular rate sensor is still inoperative, the algorithm proceeds to functional block 83 to acquire the shared function sensor data. The time-delayed data is again synthesized using the stored vehicle model to estimate a second angular rate. These estimation subroutines can be used as a failsafe alternative should an angular rate sensor malfunction or become inoperative. The present invention also contemplates that failsafe procedure shown in FIG. 9 may be utilized in the algorithms illustrated in FIGS. 5 and 6 (not shown).

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A method for compensating an axial accelerometer output for use in a vehicle control system, comprising the steps of:

(a) providing an axial accelerometer at a first location that is different from a vehicular center of gravity location, the first location defining a moment arm from an axis of a vehicle center of gravity coordinate system to the axial accelerometer, the moment arm being defined from the first location and is perpendicular to a plane that includes one of the x, y, and z axes of the vehicle center of gravity coordinate system that corresponds to the axis of rotational movement as measured by the angular rate sensor, also providing at least one angular rate sensor, and further providing a control module that is in communication with the axial accelerometer and the angular rate sensor, the control module further being operative to compensate an output signal generated by the axial accelerometer, the control module including an algorithm, the algorithm having an operation to compute the rate of change of the angular rate sensor output signal in step (d) as $d\omega/dt$ where $\omega$ is an angular velocity of at least one of the yaw, roll, and pitch rotational movement, the algorithm further having an operation to compensate the axial accelerometer output by a term of $(\omega^2 R)$ and $((d\omega/dt)R)$ where R is the inertial sensor moment arm defined from the first location that is perpendicular to a plane that includes one of the x, y, and z axis of the vehicle center of gravity coordinate system that corresponds to the axis of rotational movement as measured by the angular rate sensor, the operation to compensate the axial accelerometer output is in the form of an equation:

$$a_{corrected} = a_{measured} - \omega^2 R - (d\omega/dt)R;$$

(b) sensing an acceleration at the first location with the axial accelerometer and generating an output signal that is proportional to the acceleration;

(c) sensing a rate of change of a rotational movement about at least one axis of the vehicular center of gravity coordinate system with the angular rate sensor, the angular rate sensor generating an angular rate sensor output signal that is proportional to the rate of change of the rotational movement; and (d) the control module receiving the axial accelerometer output signal and the angular rate sensor output signal, the control module being responsive to the angular rate sensor output signal to calculate an angular acceleration, such that the control module determines a correction factor that is proportional to the moment arm and the angular acceleration and modifies the axial accelerometer output signal in response to the correction factor.

2. The method of claim 1 wherein the control module generates a control module output that is responsive to the modified axial accelerometer output signal.

3. The method of claim 1 wherein the rotational movement of step (c) is one of a roll, yaw, and pitch rotational movement about a respective x, y, and z axis of the vehicular center of gravity coordinate system, and the angular rate sensor of step (c) senses the rate of change of one of the yaw, roll, and pitch rotational movement.

4. The method of claim 3 wherein the control module includes an algorithm, the algorithm having an operation to compute the angular acceleration in step (d), the algorithm further having an operation to compensate the axial accelerometer output that is a function of the product of one of the angular rate or the angular acceleration and the moment arm.

5. The method of claim 4 wherein the output compensation function includes a function of the product of the angular rate and the moment arm and the angular acceleration and the moment arm.

6. The method of claim 1 wherein step (a) includes providing a plurality of angular rate sensors measuring the rate of change of at least two of the yaw, roll, and pitch rotational movements, and further wherein step (c) includes sensing a plurality of rotational movements about at least two corresponding x, y, and z axes of the vehicular center of gravity coordinate system.

7. The method of claim 6 wherein the control module includes an algorithm, the algorithm having an operation to compute the rate of change of a plurality of angular rate sensor output signals in step (d) as $d\omega_a/dt$ and $d\omega_b/dt$ where $\omega_a$ and $\omega_b$ are angular velocities of two of the yaw, roll, and pitch rotational movements, the algorithm further having an operation to compensate the axial accelerometer output by terms of $(\omega_a^2 R_a)$ and $((d\omega_a/dt)R_a)$ and $(\omega_b^2 R_b)$ and $((d\omega_b/dt)R_b)$ where $R_a$ and $R_b$ are the moment arms defined from the first location to a pair of orthogonal planes wherein each plane includes one of the x, y, and z axes of the vehicle center of gravity coordinate system that corresponds to the respective axis of rotational movement as measured by the plurality of angular rate sensors.

8. The method of claim 1 wherein step (a) includes providing a plurality of angular rate sensors measuring the rate of change of the yaw, roll, and pitch rotational movements, and further wherein step (c) includes sensing a plurality of rotational movements of each of the roll, yaw, and pitch rotational movements about the respective x, y, and z axes of the vehicular center of gravity coordinate system.

9. The method of claim 8 wherein the control module includes an algorithm, the algorithm having an operation to compute the rate of change of a plurality of angular rate sensor output signals in step (d) as $d\omega_a/dt$, $d\omega_b/dt$, and $d\omega_c/dt$ where $\omega_a$, $\omega_b$, and $\omega_c$ are angular velocities of the yaw, roll, and pitch rotational movements, the algorithm further having an operation to compensate the axial accelerometer output by terms of $(\omega_a^2 R_a)$ and $((d\omega_a/dt)R_a)$, and $(\omega_b^2 R_b)$ and $((d\omega_b/dt)R_b)$, and $(\omega_c^2 R_c)$ and $((d\omega_c/dt)R_c)$ where $R_a$, $R_b$, and $R_c$ are the moment arms defined from the first location to each of a plurality of orthogonal planes, each plane including one of the x, y, and z axes of the vehicle center of gravity coordinate system that correspond to the respective axis of rotational movement as measured by the plurality of angular rate sensors.

10. A method for compensating an axial accelerometer output for use in a vehicle control system, comprising the steps of:

(a) providing an axial accelerometer at a first location that is different from a vehicular center of gravity location, the first location defining an moment arm from an axis of a vehicle center of gravity coordinate system to the axial accelerometer, also providing a plurality of sensors mounted at a plurality of locations, and further providing a control module that is in communication with the axial accelerometer and the plurality of sensors, the control module further being operative to compensate an output signal generated by the inertial sensor;

(b) sensing an acceleration at the first location with the accelerometer, the accelerometer generating an output signal that is proportional to the acceleration;

(c) sensing a plurality of vehicle characteristics with the plurality of sensors and generating a plurality of sensor output signals that are each proportional to the respective sensed vehicle characteristic;

(d) the control module receiving the accelerometer output signal and the plurality of sensor output signals, the control module being operative to derive an at least one angular acceleration from the plurality of sensor output signals, characterized in that the control module determines a correction factor that is proportional to the product of the accelerometer moment arm and the at least one angular acceleration;

(e) modifying the accelerometer output signal in response to the correction factor which includes an equation in the form of:

$$a_{corrected} = a_{measured} - \omega^2 R - (d\omega/dt)R; \text{ and}$$

(f) generating a control module output that is responsive to the modified accelerometer output signal.

11. The method of claim 10 wherein the plurality of sensors is at least one of a wheel speed sensor and a throttle position sensor, and at least one of a steering angle sensor and a steering rate sensor.

12. The method of claim 11 wherein the control module includes an algorithm programmed to derive an angular velocity rate of change from the plurality of sensor output signals.

13. The method of claim 12 wherein the plurality of sensors includes at least three of a wheel speed sensor, a steering angle sensor, a steering rate sensor, an air bag deployment sensor, a suspension height sensor, and a throttle position sensor.

14. An inertial motion sensing system for generating a compensated accelerometer output, the system comprising:
- at least one axial accelerometer mounted at a first location that is different from a vehicular center of gravity location, the first location further defining a moment arm from an axis of a vehicle center of gravity coordinate system to the accelerometer, the accelerometer being operative to sense an acceleration at the first location and to generate an output signal that is proportional to the acceleration;
- at least one of a plurality of sensors mounted at an at least one of a plurality of locations, the at least one of a plurality of sensors being operative to sense an at least one of a plurality of vehicle characteristics about the axis of the vehicular center of gravity coordinate system, the at least one of a plurality of sensors being further operative to generate an at least one of a plurality of sensor output signals; and
- a control module in communication with the at least one accelerometer and the at least one of a plurality of sensors,
- characterized in that the control module is operative to derive an at least one angular acceleration from the plurality of sensor output signals, the control module being also operative to calculate a correction factor, the control module being further operative to modify the accelerometer output signal in response to the correction factor which includes an equation in the form of $$a_{corrected} = a_{measured} - \omega^2 R - (d\omega/dt)R;$$

the control module further generating a control module output that is responsive to the modified output signal.

15. The inertial motion sensing system of claim 14 wherein the at least one of a plurality of sensors is at least one angular rate sensor, the at least one of a plurality of locations is a second location, and the at least one vehicle characteristic is a rate of change of a rotational movement.

16. The inertial motion sensing system of claim 15 wherein the at least one angular rate sensor is a plurality of angular rate sensors and the control module includes an algorithm, the algorithm having an operation to compute the rate of change of at least one angular rate sensor output signal as at least one of $d\omega_a/dt$, $d\omega_b/dt$, and $d\omega_c/dt$ where $\omega_a$, $\omega_b$, and $\omega_c$ are angular velocities of the yaw, roll, and pitch rotational movements, the algorithm further having an operation to compensate the accelerometer output by terms of at least one of $(\omega_a^2 R_a)$ and $((d\omega_a/dt)R_a)$, and $(\omega_b^2 R_b)$ and $((d\omega_b/dt)R_b)$, and $(\omega_c^2 R_c)$ and $((d\omega_c/dt)R_c)$ where $R_a$, $R_b$, and $R_c$ are the moment arms defined from the first location to each of a plurality of orthogonal planes, each plane including one of the x, y, and z axes of the vehicle center of gravity coordinate system that correspond to the respective axis of rotational movement as measured by the plurality of angular rate sensors.

17. The method of claim 14 wherein the at least one of a plurality of sensors is a plurality of sensors that includes at least three of a wheel speed sensor, a steering angle sensor, a steering rate sensor, an air bag deployment sensor, a suspension height sensor, and a throttle position sensor, and the control module includes an algorithm programmed to derive an angular velocity rate of change from the output signals of the three selected sensors.

18. A vehicle control system for modifying a dynamic characteristic of a vehicle, comprising:
- an accelerometer mounted at a first location that is different from a vehicular center of gravity location, the first location further defining a moment arm from an axis of a vehicle center of gravity coordinate system to the accelerometer, the accelerometer being operative to measure an acceleration at the first location and to generate an output signal that is proportional to the acceleration;
- at least one angular rate sensor mounted at a second location, the at least one angular rate sensor being operative to measure a rate of change of a rotational movement about the axis of the vehicular center of gravity coordinate system, the angular rate sensor being further operative to generate an angular rate sensor output signal;
- a vehicle dynamic subsystem including a subsystem controller in communication with a subsystem actuator, the subsystem actuator being responsive to the subsystem controller to alter a movement of the vehicle center of gravity location; and
- a control module being in communication with the accelerometer, the angular rate sensor, and the subsystem controller,
- characterized in that the control module includes an algorithm, the algorithm being operative to calculate a rate of change of the angular rate sensor output signal and to calculate a correction factor, the algorithm being further operative to modify the accelerometer output signal in response to the correction factor which includes the equation:

$$a_{corrected} = [(a_{measured})^2 - (\omega^2 R)^2]^{1/2} - (d\omega/dt)R,$$

the control module being further operative to generate a control module output that is communicated to the subsystem controller in order to operatively actuate the subsystem actuator.

19. The vehicle control system of claim 18 wherein the vehicle dynamic subsystem is at least one of an antilock braking system, a traction control system, a throttle control system, and a suspension control system, the vehicle dynamic subsystem including a subsystem controller mounted on at least a portion of the vehicle dynamic subsystem.

20. The vehicle control system of claim 19 wherein the subsystem controller is part of the control module.

* * * * *